United States Patent [19]

Unruh et al.

[11] Patent Number: 5,421,318

[45] Date of Patent: Jun. 6, 1995

[54] MOBILE PORTABLE PIT COOKING APPARATUS

[76] Inventors: Dennis L. Unruh, R.R. 1, Box 175, Canton, Kans. 67428; Marlin Unruh, P.O. Box 284; Randal A. Koehn, P.O. Box 155, both of Galva, Kans. 67443

[21] Appl. No.: 43,880

[22] Filed: Apr. 7, 1993

[51] Int. Cl.⁶ ............................................. A47J 37/04
[52] U.S. Cl. ................................ 126/25 A; 126/25 R; 126/9 R; 99/421 H; 99/447
[58] Field of Search .............. 99/340, 401, 421 H, 99/421 HH, 447, 449, 450, 482, 421 HV, 421 R, 420; 126/25 A, 25 R, 9 R; 280/47.34, 62, 79.11

[56] References Cited

U.S. PATENT DOCUMENTS

| | | | |
|---|---|---|---|
| 2,472,164 | 6/1949 | Mannheimer | 126/25 |
| 2,473,569 | 6/1949 | Cast | 126/25 A |
| 2,691,368 | 10/1954 | Hood | 126/25 |
| 2,722,883 | 11/1955 | Rignell | 126/25 R |
| 2,747,569 | 5/1956 | Holm | 126/25 R |
| 2,894,448 | 7/1959 | Henderson | 99/340 |
| 2,908,266 | 10/1959 | Cooper | 280/47.34 |
| 2,968,301 | 1/1961 | Cowart | 126/25 |
| 3,286,620 | 11/1966 | Brown | 126/25 R |
| 3,333,529 | 8/1967 | Wilson | 99/427 |
| 3,372,636 | 3/1968 | Marasco | 99/427 |
| 3,568,596 | 3/1971 | Grice | 126/25 R |
| 3,683,791 | 8/1972 | Rast | 99/340 |
| 3,861,290 | 1/1975 | Ringo | 99/427 |
| 3,943,837 | 3/1976 | Trkla | 126/25 A |
| 4,037,580 | 7/1977 | Angelo | 126/25 R |
| 4,184,420 | 1/1980 | Podaras et al. | 99/427 |
| 4,572,062 | 2/1986 | Widdowson | 99/340 |
| 4,867,051 | 9/1989 | Schalk | 99/443 C |
| 4,968,515 | 11/1990 | Burkett | 99/421 R |
| 5,163,359 | 11/1992 | McLane | 126/25 R |
| 5,205,207 | 4/1993 | McGuire | 99/421 H |
| 5,255,664 | 10/1993 | Gurlacci | 126/276 |

FOREIGN PATENT DOCUMENTS 151422 2/1903 Switzerland .................. 99/421 HV

Primary Examiner—David A. Scherbel
Assistant Examiner—Terrence R. Till
Attorney, Agent, or Firm—John R. Flanagan

[57] ABSTRACT

A portable pit cooking apparatus includes a heat distributing assembly which permits controlled burning of a solid fuel material and substantially uniform distribution of heat across the cooking region of the apparatus, a towing assembly which supports the heat distributing assembly above a support surface for rendering it mobile for transport over the support surface to a desired cooking site and for retaining a stationary once the desired site has been reached, a fire height adjusting assembly which permits tailoring of the position of the fire to the type of cooking to be carried out, a rotisserie assembly which provides for uniform and slow cooking of a large quantity of food and permits easy and quick removal and disassembly to clean the parts thereof and to convert to other cooking options, an adjustable hood assembly for covering the cooking chamber, and an ash collection and removal assembly which permits easy washout and cleanup of the apparatus.

12 Claims, 3 Drawing Sheets

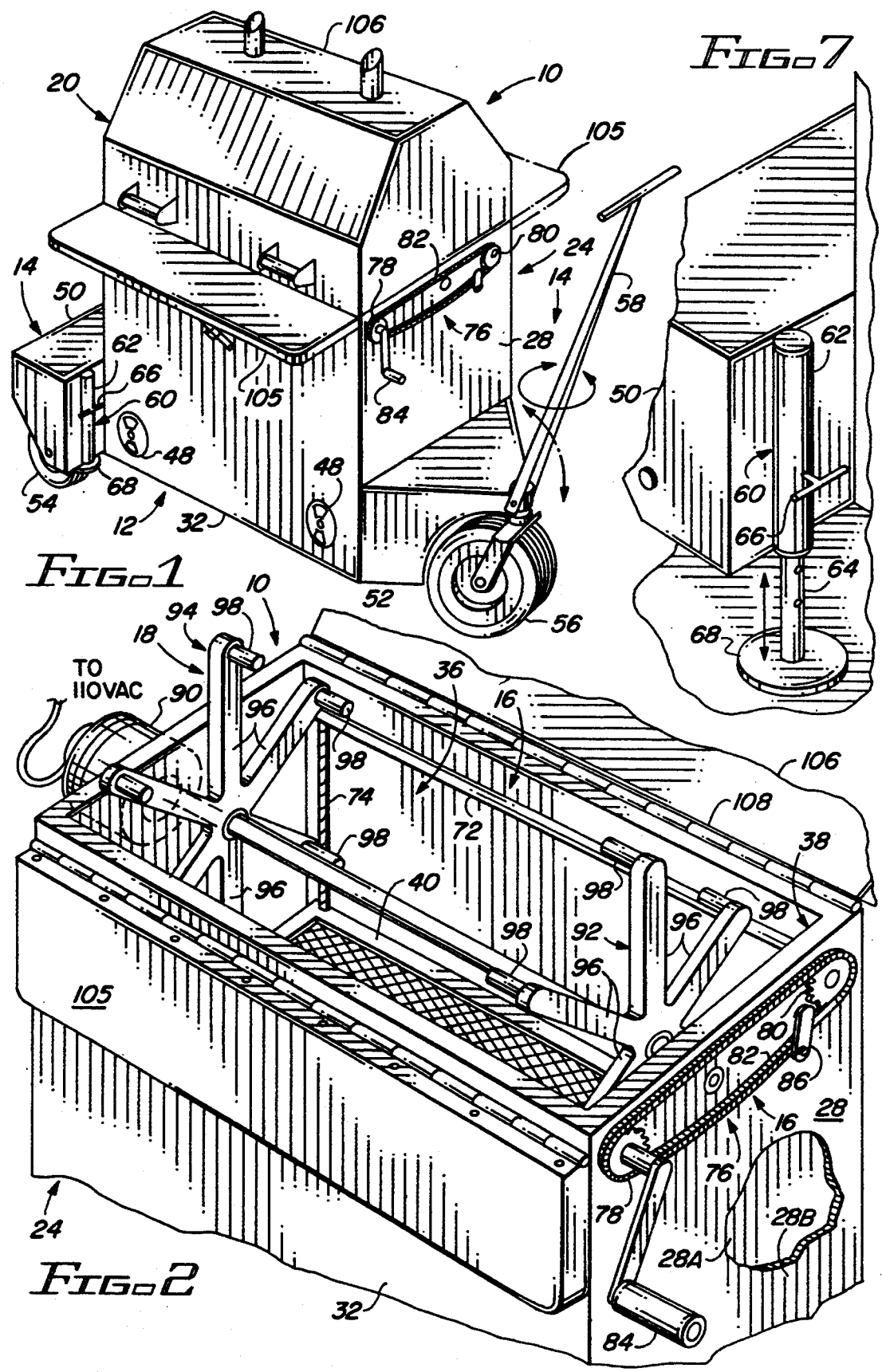

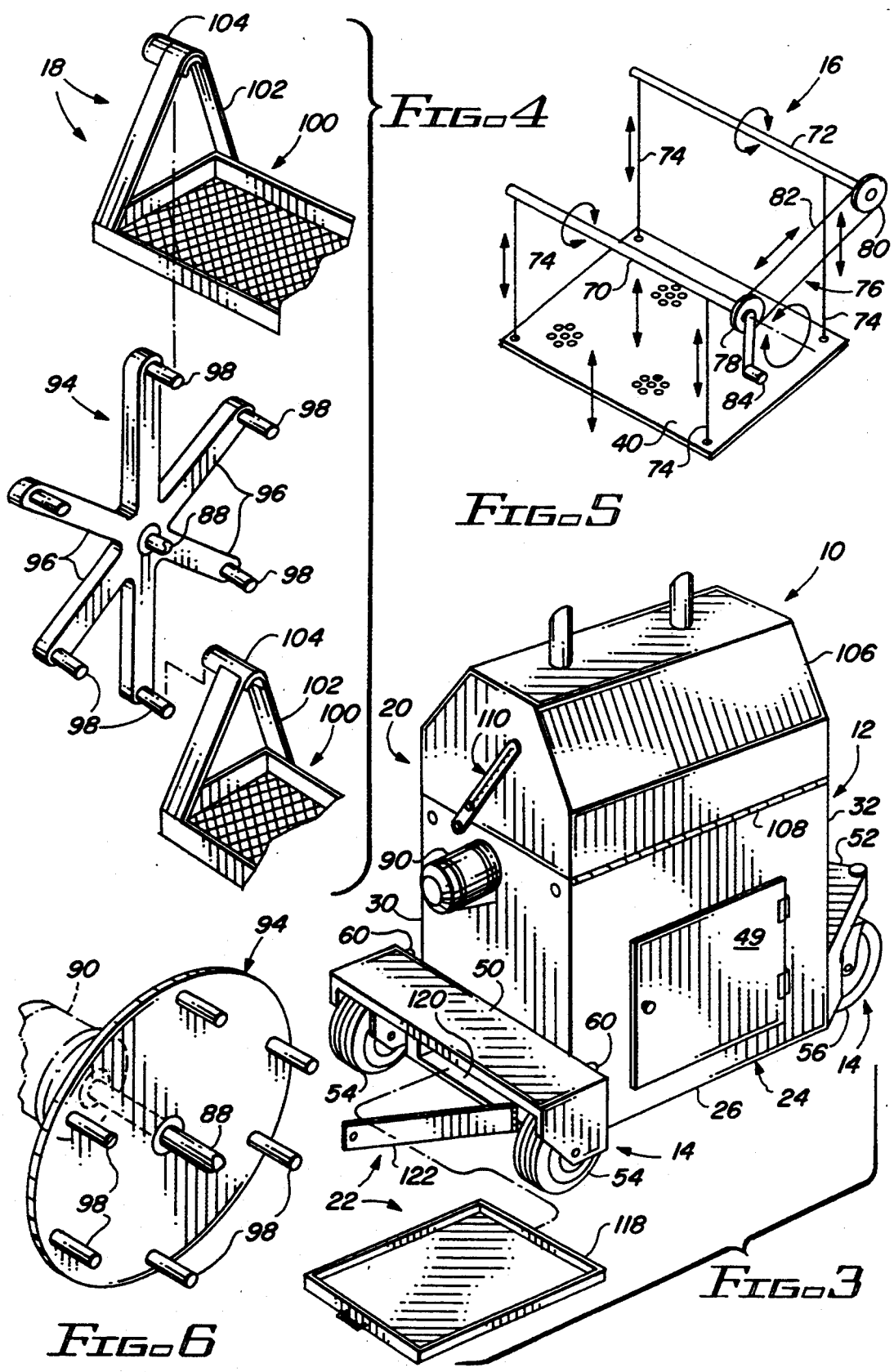

MOBILE PORTABLE PIT COOKING APPARATUS

BACKGROUND OF THE INVENTION

1. Field of the Invention

The present invention generally relates to cooking apparatus for barbecuing food and, more particularly, is concerned with a portable pit cooking apparatus.

2. Description of the Prior Art

Barbecuing has been and will continue to be a popular outdoor activity whether on a family or small group basis or a larger scale. A variety of well-known grills and hibachies are used by families and small groups to serve their barbecuing needs. Basically, these devices are typically comprised of an open grill supported over a charcoal tray. Although such devices satisfy the needs of families and smaller groups of people, they normally have insufficient cooking capacity for larger groups.

Pit-type cooking apparatus have been designed and utilized heretofore for accommodating the needs of larger groups of people. Some representative examples of these devices are the ones disclosed in U.S. patents to Mannheimer U.S. Pat. No. 2,472,164, Hood U.S. Pat. No. 2,691,368, Cowart U.S. Pat. No. 2,968,301, Ringo U.S. Pat. No. 3,861,290, Trkla U.S. Pat. No. 3,943,837 and Podaras et al U.S. Pat. No. 4,184,420.

U.S. Pat. No. 2,472,164 to Mannheimer discloses a stationary cooking apparatus having an upper grill and a lower fire basket suspended below the grill on a pair of flexible chains. Also, an arrangement of shafts, reels, a crank arm and a ratchet and pawl is provided for adjusting and retaining the fire basket at various elevations relative to the upper grill. U.S. Pat. No. 2,691,368 to Hood discloses a mobile cooking apparatus having a box-like body and a grill being vertically adjustable within the body by rotation of a shaft having a hand crank and suspending the grill by chains.

U.S. Pat. No. 2,968,301 to Cowart discloses a stationary cooking apparatus having a grill mounted over a fire pit chamber and a lift mechanism with a screw shaft for elevating a fire pan within the chamber. U.S. Pat. No. 3,861,290 to Ringo discloses a stationary cooking apparatus having a plurality of broiling trays supported between radial arms on spiders mounted on opposite ends of a rotary shaft.

U.S. Pat. No. 3,943,837 to Trkla discloses a portable cooking apparatus having a grill suspended between a lower fuel tray and an upper rotisserie by chains extending around arms of a handle member. U.S. Pat. No. 4,184,420 to Podaras et al discloses a stationary cooking apparatus having a housing and a ferris wheel type rotatable meat holder mounted within the housing above a lower fire shield which overlies gas burners. The meat holder includes a plurality of racks having opposite end lugs being pivotally supported between a pair of end rings by pivot pins.

An ideal cooking apparatus for barbecuing and grilling food in quantities which will accommodate the needs of large groups of people is one which is portable and incorporates a number of different features which working together facilitate effective control of the cooking process, conversion between types of cooking processes, and maintenance of the cooking apparatus. None of the cooking apparatus of the aforementioned patents is perceived to come even close to having the combination of different features necessary to lead toward this ideal. Consequently, a need still exists for a cooking apparatus which more nearly approaches the ideal.

SUMMARY OF THE INVENTION

The present invention provides a portable pit cooking apparatus designed to satisfy the aforementioned needs by more nearly approaching the ideal cooking apparatus. The cooking apparatus of the present invention employs various features which makes it easily transportable to different sites, readily convertible between different uses, such as a slow cooking pit barbecuing apparatus or as a high heat cooking apparatus adapted to grill all types of meat, and conveniently accessible and disassemblible for washing and cleaning its various parts.

A first feature of the cooking apparatus is a heat distributing assembly which permits controlled burning of the solid fuel material and substantially uniform distribution of heat across the cooking region of the apparatus. The heat distributing assembly includes a housing defining a deep interior cooking chamber with an open top, a fire tray disposed in the cooking chamber for containing a solid fuel material, a burn partition structure disposed in the cooking chamber over the fire tray for providing controlled burn of the solid fuel material on the fire tray, and a heat distribution structure disposed in the cooking chamber over the burn partition structure for deflecting the heat being produced by burning of the solid fuel material on the fuel tray to flow in a substantially uniform distribution pattern upwardly through the cooking chamber.

A second feature of the cooking apparatus is a towing assembly which supports the housing above a support surface for rendering it mobile for transport over the support surface to a desired cooking site and for retaining it stationary once the desired site has been reached. The mobile towing assembly includes a pair of laterally spaced non-steerable rear wheels, a single steerable caster-type front wheel and a towing handle for permitting one person to easily tow and maneuver the mobilized housing in any direction. The towing assembly also includes one or more stabilizing stands adjustable between raised and lowered positions in which the stands contact the support surface and secure the cooking apparatus against rolling due to irregularities of the support surface.

A third feature of the apparatus is a fire height adjusting assembly which permits tailoring of the position of the fire to the type of cooking to be carried out. The fire height adjusting assembly includes a pair of shafts mounted through an upper portion of the housing and across the cooking chamber therein, a plurality of elongated flexible members, such as cables, disposed within the cooking chamber adjacent to the corners thereof and attached at upper ends to the shafts adjacent to opposite ends thereof and at lower ends to the corners of the fire tray, and a drive mechanism disposed at the exterior of the housing outside of the cooking chamber and supported by one pair of the opposite ends of the shafts. The drive mechanism includes a pair of sprockets attached on the one ends of the shafts, a drive chain entrained over and extending between the pair of sprockets, a crank attached to one of the shafts for manually turning the shafts to raise and lower the fire tray and a locking pawl engageable with one of the sprockets for holding the one engaged sprocket stationary to retain the fire tray at the desired adjusted height in the cooking chamber.

A fourth feature is a rotisserie assembly which provides for uniform and slow cooking of a large quantity of food and permits easy and quick removal and disassembly to clean the parts thereof and to convert to other cooking options. The rotisserie assembly includes an elongated drive shaft rotatably mounted between opposite end walls of the housing, a manual or automatic source of drive power mounted to the exterior of the housing and coupled to one end of the drive shaft, a pair of spiders supported in the cooking chamber by the drive shaft adjacent to the opposite ends thereof, and a plurality of cooking baskets hung upon and extending between aligned pairs of radial arms of the spiders. The baskets are easily installed on and removed from the spiders for quick assembling and disassembling of the rotisserie assembly and maintenance thereof.

Other important features of the cooking apparatus which contribute to its overall effectiveness include an adjustable hood assembly for covering the cooking chamber and an ash collection and removal assembly which permits easy washout and cleanup of the housing.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front perspective view of a portable pit cooking apparatus of the present invention.

FIG. 2 is an enlarged fragmentary perspective view of a rotisserie assembly of the cooking apparatus.

FIG. 3 is a rear perspective view of the cooking apparatus.

FIG. 4 is an exploded fragmentary perspective view of the rotisserie assembly of the cooking apparatus.

FIG. 5 is a diagrammatic representation of a fire height adjusting assembly of the cooking apparatus.

FIG. 6 is an enlarged perspective view of an alternative construction of the rotisserie assembly of the cooking apparatus.

FIG. 7 is an enlarged fragmentary perspective view of a stabilizer stand of the cooking apparatus.

DETAILED DESCRIPTION OF THE INVENTION

Figure 8:
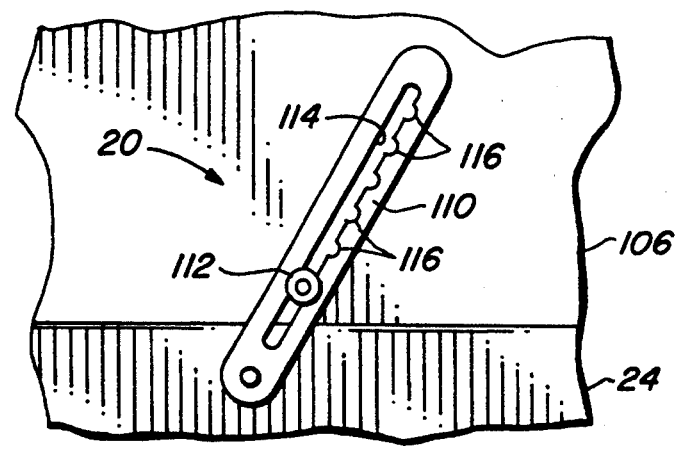
FIG. 8 is an enlarged perspective view of an adjustable hood assembly of the cooking apparatus.
Figure 9:
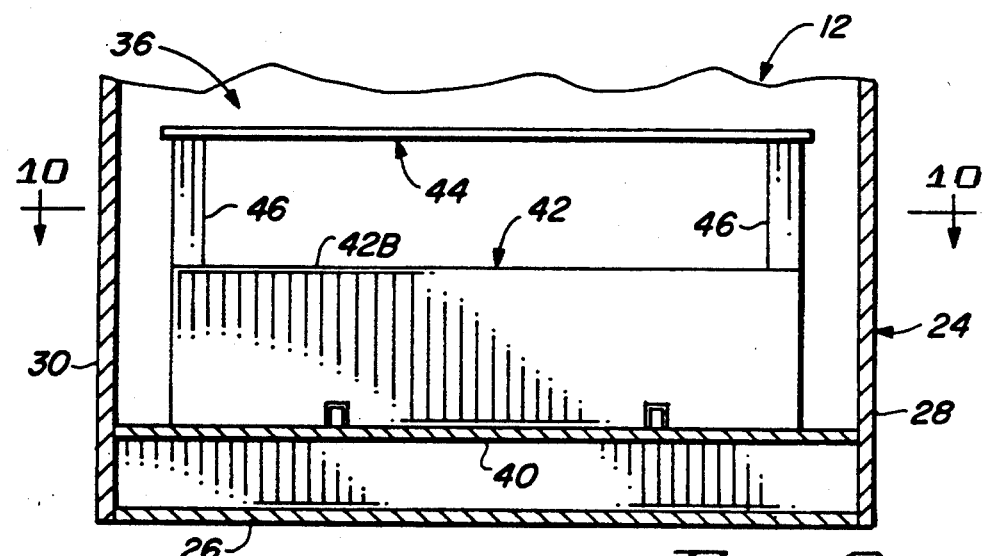
FIG. 9 is an enlarged side elevational view of a heat distrubuting assembly of the cooking apparatus.
Figure 10:
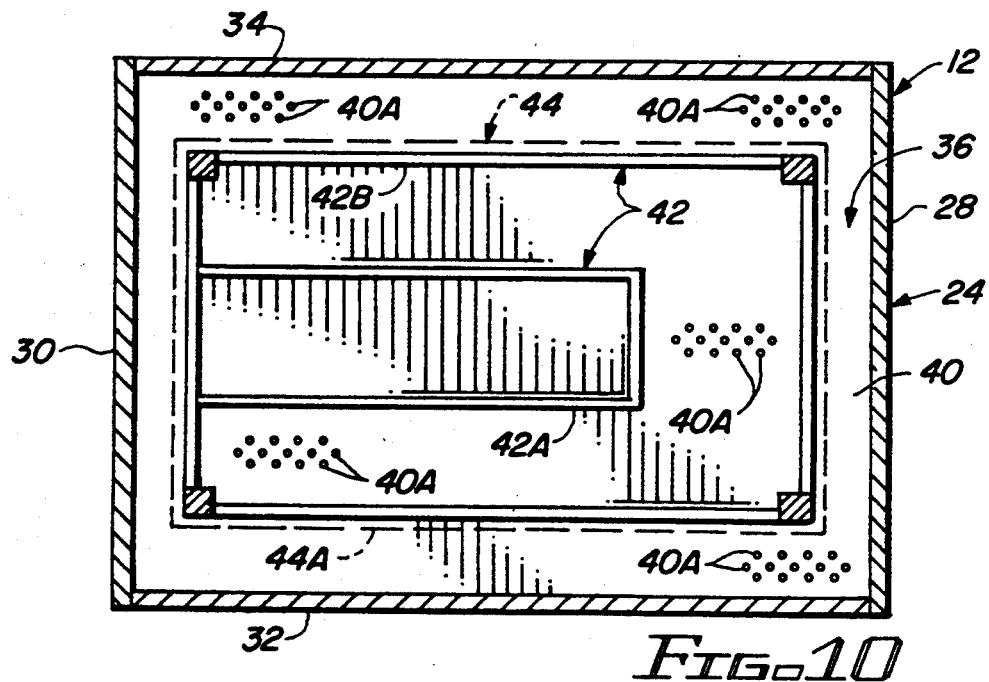
FIG. 10 is a top plan view of the heat distributing assembly of cooking apparatus as seen along line 10—10 of FIG. 9.

In the following description, like reference characters designate like or corresponding parts throughout the several views of the drawings. Also in the following description, it is to be understood that such terms as "top", "bottom", "front", "rear" and the like are words of convenience and are not to be construed as limiting terms.

Referring to the drawings and particularly to FIGS. 1–3, there is illustrated a portable pit cooking apparatus, generally designated 10, of the present invention. Basically, the cooking apparatus 10 includes a heat distributing assembly 12, a towing assembly 14, a fire height adjusting assembly 16, a rotisserie assembly 18, an adjustable hood assembly 20 and an ash collection and removal assembly 22.

Referring to FIGS. 1–3, 9 and 10, the heat distributing assembly 12 of the cooking apparatus 10 permits controlled burning of a suitable fuel material, such as charcoal, wood, etc., and substantially uniform distribution of heat flow within the cooking apparatus 10. More particularly, the heat distributing assembly 12 includes a housing 24 having a bottom wall 26 and a pair of opposite front and rear end walls 28, 30 and a pair of opposite right and left side walls 32, 34 extending upwardly from the bottom wall 26. The respective walls 26–34 are interconnected together and define an interior cooking pit or chamber 36 having an open top 38. As seen in FIG. 2, preferably the walls of the housing 24 have an inner and outer wall portions 28A, 28B providing a double wall construction.

Also, the heat distributing assembly 12 of the cooking apparatus 10 includes a fire support tray 40, a burn partition structure 42 and a heat distribution structure 44. The fire support tray 40 is a flat plate disposed in the cooking chamber 36 for supporting the fuel material thereon and having a plurality of apertures 40A formed therein permitting ash residue of the burned fuel material to fall through the tray. The burn partition structure 42 is disposed in the cooking chamber 36 upon and over the fire support tray 40 for providing a controlled burn of the fuel material supported on the fire support tray 40. The heat distribution structure 44 is disposed in the cooking chamber 36 over the burn partition structure 42 for deflecting the heat flow being produced by combustion or burning of the fuel material on the fuel support tray 40 into a substantially uniform distribution pattern upwardly through the cooking chamber 36.

More particularly, the burn partition structure 42 includes an inner annular portion 42A and an outer portion 42B encompassing being spaced outwardly from the inner portion 42A and defining a generally U-shaped fuel loading cavity 44 therebetween. The fuel material can be arranged in a desired pattern, preferably C-shaped, on the fire support tray 40 which controls the path and thus the time duration of the burning of the fuel material. The heat flow distribution structure 44 is a substantially flat baffle or deflector plate 44 mounted spaced above and overlying the burn partition structure 42 by a plurality of support legs 46. The deflector plate 44 has a continuous peripheral edge 44A and is adapted to deflect heat flow outwardly beyond and around the peripheral edge thereof.

Also, as seen in FIG. 1, the heat distributing assembly 12 includes at least one and preferably a plurality of adjustable air vents 48 provided in the side walls 32, 34 of the housing 24 for controlling the flow of air into the housing 24 through the cooking chamber 36 and over the fire support tray 40 and thereby controlling the rate of burning of the fuel material on the tray 40. A large door 49 is hingedly mounted on the right side wall 32 for gaining access to the interior of the cooking chamber 36 in order to introduce a full load of fuel material at the start into the annular fuel loading cavity 44 defined by the burn partition structure 42 and onto the fire support tray 40. The presence of the annular fuel loading cavity 44 permits initial firing of the fuel at only one end; then, as more heat is needed, the air vents 48 are opened more and the air feeds the fire and it progresses along the annular pattern of the fuel material. Thus, the presence of the burn partition structure 42 eliminates the need to periodically add fuel material during an extended cooking period. Also, any unburned fuel material can be saved for use at another time.

Referring to FIGS. 1, 3 and 7, the towing assembly 14 of the cooking apparatus 10 supports the housing 24 above a support surface S, mobilizing it for easy transport over the support surface S to a desired cooking site. More particularly, the towing assembly 14 includes respective rear and front support brackets 50, 52 being attached to the exterior lower portions of rear and front end walls 30, 28 of the housing 24 and respectively disposed rearwardly and forwardly thereof. The towing assembly 14 also includes a pair of laterally spaced nonsteerable rear wheels 54 rotatably mounted to the rear support bracket 50 and capable of undergoing rotation about a common horizontal axis located rearwardly of the rear end wall 30 of the housing 24, and a single steerable caster-type front wheel 56 mounted to the front support bracket 52 and capable of undergoing rotation about a horizontal axis located forwardly of the front end wall 28 of the housing 24 and steering about a vertical axis. Also, an elongated detachable towing handle 58 is coupled to the front wheel 56 for permitting one person to easily tow and maneuver the mobilized housing 24 in any direction.

Further, the towing assembly 14 is adapted to retain the mobilized housing 24 in a stationary position once the desired site has been reached. In particular, the towing assembly 14 also includes one or more stabilizing stands 60 mounted at least on the rear support bracket 50 forwardly of the rear wheels 54. Each stabilizing stand 60 includes an upper tube 62 rigidly attached in a vertical orientation to the rear support bracket 50, a lower tube 64 slidably mounted in the upper tube 60A and a lock handle 66 threaded into the upper tube 62 for tightening against the lower tube 64 to hold it at a desired position relative to the upper tube 62. Thus, the lower tube 64 can be adjusted between a raised or stored position, as seen in FIG. 1, in which the lower tube 64 of the stand 60 is out of contact with the support surface S and a lowered or deployed position, as seen in FIG. 7, in which a disc 68 attached on the bottom end of the lower tube 64 of the stand 60 contacts the support surface S and thereby secures the mobilized housing 24 against rolling due to irregularities of the support surface S.

Referring to FIGS. 2 and 5, the fire height adjusting assembly 16 of the cooking apparatus 10 permits adjustment of the position of the fire to the type of cooking to be carried out. More particularly, the fire height adjusting assembly 16 includes a pair of elongated shafts 70, 72 and a plurality of inelastic flexible cables 74. The shafts 70, 72 are mounted through upper portions of the front and rear end walls 28, 30 of the housing 24 and extend across the cooking chamber 36. The cables 74 are disposed within the cooking chamber 36 adjacent to the four corners thereof. Each cable 74 is attached at an upper end 74A to one of the shafts 70, 72 adjacent to one of the opposite ends thereof and at a lower end 74B to one of the four corners of the fire support tray 40.

Also, the fire height adjusting assembly 16 includes a drive mechanism 76 disposed at the exterior of the housing 24 outside of the cooking chamber 36 and supported by one pair of the opposite ends of the shafts 70, 72. The drive mechanism 76 includes a pair of sprockets 78, 80 attached on the one ends of the shafts 70, 72 and an endless drive chain 82 entrained over and extending between the pair of sprockets 78, 80. The drive mechanism 76 also includes a crank 84 attached to the right shaft 70 and being manually operable for turning the shafts 70, 72 to raise and lower the fire support tray 40.

The drive mechanism 76 further includes a locking pawl 86 pivotally mounted to the front end wall 28 of the housing 24 adjacent to the right sprocket 78. The locking pawl 86 is engageable with the right sprocket 78 for holding the drive mechanism 76 in a stationary condition to retain the fire support tray 40 at a desired adjusted height in the cooking chamber 36.

Referring to FIGS. 2 and 4, the rotisserie assembly 18 of the cooking apparatus 10 provides for uniform and slow cooking of a large quantity of food and permits easy and quick removal and disassembly to clean the parts thereof and to convert to other cooking options. More particularly, the rotisserie assembly 18 includes an elongated central drive spit or shaft 88, a drive power source 90, a pair of front and rear spiders 92, 94. The drive shaft 88 is rotatably mounted to upper portions of and extending between the front and rear end walls 28, 30 of the housing 24. The drive power source 90 can be a manually or automatically powered source. In FIGS. 2 and 3, the illustrated drive power source 90 is an electric motor 90 mounted to the exterior of the rear end wall 30 of the housing 24 and coupled to the rear end of the drive shaft 88.

The front and rear spiders 92, 94 are supported in the cooking chamber 36 by the drive shaft 88 adjacent to the opposite ends thereof. In the embodiment of FIGS. 2 and 4, each of the spiders 92, 94 includes a plurality of arms 96 extending radially relative to the central shaft 88 and a plurality of support pins 98 fixed on and projecting outwardly from the respective arms 96 of each of the respective spiders 92, 94. The support pins 98 on the arms 96 of each spider 92, 94 are disposed in circumferentially spaced relation to one another about a central rotational axis of the spiders 92, 94 defined by the central shaft 88. The support pins 98 on one of the spiders 92, 94 protrude outwardly therefrom in parallel relation to one another and to the rotational axis toward and aligned with the support pins 98 on the other of the spiders 92, 94 such that the support pins 98 on the one spider 92, 94 are disposed in aligned pairs with the support pins 98 on the other spider 92, 94. In an alternative embodiment of FIG. 6, the spiders 92, 94 takes the form of a flat circular disc on which are mounted the support pins 98.

The rotisserie assembly 18 also includes a plurality of elongated cooking baskets 100. The cooking baskets 100 are easily installed on and removed from the spiders 92, 94 for quick assembling and disassembling of the rotisserie assembly 18 and maintenance thereof. Each of the elongated cooking baskets 100 extends between the opposite spiders 92, 94 and have a pair of hangers 102 attached to the opposite ends of the cooking basket 100 and extending upwardly therefrom. The hangers 102 of each basket 100 have semi-cylindrical couplers 104 attached to upper ends of the hangers, the couplers being removably fitted over one of the aligned pairs of support pins 98 on the spiders 92, 94. Through use of the support pins 98 and couplers 104, the cooking baskets 96 are hung upon and extend between the aligned pairs of radial arms 96 of the spiders 92, 94. The spiders 92, 94 can be installed and removed from the central shaft 88 by any suitable means, such as by the provision of radial slot (not shown) at the hub region of the spiders 92, 94 which is closed by a suitable fastening member when the spiders are mounted on the shaft 88. When cooking without the rotisserie assembly 18 is desired and thus the rotisserie assembly 18 is removed, other types of cooking devices (not shown) can be employed over the open top 38 of the housing 24, such as a flat grate, flat griddle and a fish fryer. Also, one or more cutting boards 105 are pivotally mounted along upper portions of the opposite side walls 32, 34 of the housing 24 to provide more working space. The boards 105 can be folded down when not in use.

Referring to FIGS. 1, 3 and 8, the adjustable hood assembly 20 of the cooking apparatus 10 is adapted for covering the cooking chamber 36. More particularly, the adjustable hood assembly 20 includes a cover or hood 106 pivotally mounted to the open top 38 of the housing 24 by a hinge 108 for undergoing pivotal movement relative to the housing 24 between opened and closed positions. The adjustable hood assembly 20 also includes an elongated ratchet arm 110 pivotally mounted at one end to the housing 24 adjacent to the hood 106 and a latch 112 mounted to the hood 106 adjacent to the arm 110. The ratchet arm 110 has an elongated substantially enclosed slot 114 defined therein and a plurality of notches 116 spaced apart from one another and defined in the ratchet arm 110 along and opening into the slot 114. The latch 112 is interfitted with the ratchet arm 110 through the slot 114 therein. Also, the latch 112 is movable along the slot 114 and arm 110 upon moving the hood 106 relative to the housing 24. Further, the latch 112 is seatable in a selected one of the notches 116 to place the hood 106 at a desired angular position relative to the open top 38 of the housing 24.

Referring to FIG. 3, the ash collection and removal assembly 22 of the cooking apparatus 10 permits easy washout and cleanup of the cooking apparatus 10. The collection and removal assembly 22 includes a drawer-type pan 118 slidably insertable and removable through a narrow opening 120 in the lower portion of the rear end wall 30 and upon the bottom wall 26 of the housing 24. A narrow door 122 is hingedly attached to the rear end wall 30 and pivotally movable to open and close the narrow opening 120. When the ash pan 118 is pulled out, the bottom of the cooking chamber 36 is accessible for easy washout and cleaning out of the fuel material ash.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

We claim:

1. A portable pit cooking apparatus, comprising:
   (a) a housing defining a cooking chamber;
   (b) a fire support tray disposed in said cooking chamber for supporting a burning fuel material thereon; and
   (c) a burn partition structure disposed in said cooking chamber over said fire support tray and having a predetermined configuration in which the fuel material is arranged in a pattern on said fire support tray which controls the path of burning of the fuel material, said burn partition structure including an inner portion and an outer portion encompassing and spaced outwardly from said inner portion and defining a cavity therebetween in which the fuel material is arranged in said pattern on said fire support tray which controls the path of burning of the fuel material.

2. The apparatus of claim 1 wherein said housing includes a bottom wall and pairs of opposite end and side walls extending upwardly from said bottom wall and defining said cooking chamber.

3. A portable pit cooking apparatus, comprising:
   (a) a housing defining a cooking chamber;
   (b) a fire support tray disposed in said cooking chamber for supporting a burning fuel material thereon; and
   (c) a burn partition structure disposed in said cooking chamber over said fire support tray and having a predetermined configuration in which the fuel material is arranged in a pattern on said fire support tray which controls the path of burning of the fuel material, said burn partition structure including an inner portion and an outer portion encompassing and spaced outwardly from said inner portion and defining a cavity therebetween in which the fuel material is arranged in said pattern on said fire support tray which controls the path of burning of the fuel material; and
   (d) a heat flow distribution structure disposed in said cooking chamber over said burn partition structure and having a predetermined configuration in which heat flow being produced by burning of the fuel material on said fire support tray is deflected into a substantially uniform distribution pattern upwardly through said cooking chamber.

4. The apparatus of claim 1 wherein said heat flow distribution structure is substantially flat plate mounted above and overlying said burn partition structure, said plate having a continuous peripheral edge and being adapted to deflect heat flow outwardly beyond and around said peripheral edge thereof.

5. The apparatus of claim 1 further comprising:
   at least one air vent provided in said housing and being adjustable for controlling the flow of air over said fire support tray and thereby controlling the rate of burning of the fuel material thereon.

6. The apparatus of claim 1 further comprising:
   a towing assembly supporting said housing above a support surface and mobilizing said housing for movement across the support surface.

7. The apparatus of claim 6 wherein said towing assembly includes:
   a pair of laterally spaced non-steerable rear wheels mounted adjacent to a rear of said housing; and
   a single steerable caster-type front wheel mounted adjacent to a front of said housing.

8. The apparatus of claim 7 wherein said towing assembly also includes at least one stabilizing stand mounted adjacent to said housing and being adjustable between raised position in which said stand is disposed above the support surface and lowered position in which said stand contacts the support surface and secures said housing against rolling due to irregularities of the support surface.

9. The apparatus of claim 7 wherein said towing assembly also includes a towing handle for coupling to said steerable front wheel to permit a person to tow and maneuver said mobilized housing in any direction.

10. A portable pit cooking apparatus, comprising:
    (a) a housing defining a cooking chamber;
    (b) a fire support tray disposed in said cooking chamber for supporting a burning fuel material; and (c) a fire height adjusting assembly supporting said fire support tray in said cooking chamber and being adjustable to set the vertical position of said fire support tray in said cooking chamber and thereby the vertical position of a fire produced by the burning of the fuel material thereon;

(d) said fire height adjusting assembly including (i) a pair of shafts extending through an upper portion of said housing and across said cooking chamber therein, each of said shafts having a pair of opposite ends rotatably mounted to said upper portion of said housing, (ii) a plurality of elongated flexible members extending vertically within said cooking chamber and being attached at upper ends to said shafts adjacent to said opposite ends thereof and at lower ends to said fire support tray, and (iii) a drive mechanism disposed outside of said housing and thereby outside of said cooking chamber therein and coupled to said shafts, said drive mechanism being operable to cause winding and unwinding of said flexible members around and from said shafts to thereby cause raising and lowering of said fire support tray in said cooking chamber;

(e) said drive mechanism including (i) a pair of sprockets each attached on one of said pair of opposite ends of said shafts, (ii) a drive chain entrained over and extending between said sprockets, and (iii) a crank attached to one of said shafts for manually turning said shafts and moving said drive chain and sprockets to cause the raising and lowering of said fire support tray.

11. The apparatus of claim 10 wherein said drive mechanism also includes a locking pawl mounted on said housing adjacent to and engageable with one of said sprockets for holding said one engaged sprocket stationary to retain said fire support tray at a desired adjusted height in said cooking chamber.

12. A portable pit cooking apparatus, comprising:

(a) a housing defining a cooking chamber;

(b) a fire support tray disposed in said cooking chamber for supporting a burning fuel material;

(c) a fire height adjusting assembly supporting said fire support tray in said cooking chamber and being adjustable to set the vertical position of said fire support tray in said cooking chamber and thereby the vertical position of a fire produced by the burning of the fuel material thereon, said fire height adjusting assembly including (i) a pair of shafts extending through an upper portion of said housing and across said cooking chamber therein, each of said shaft having a pair of opposite ends rotatably mounted to said upper portion of said housing, (ii) a plurality of elongated flexible members extending vertically within said cooking chamber and being attached at upper ends to said shafts adjacent to said opposite ends thereof and at lower ends to said fire support tray, and (iii) a drive mechanism disposed outside of said housing and thereby outside of said cooking chamber therein and coupled to said shafts, said drive mechanism being operable to cause winding and unwinding of said flexible members around and from said shafts to thereby cause raising and lowering of said fire support tray in said cooking chamber;

(d) a hood mounted to an upper open end of said housing for undergoing pivotal movement relative to said housing between opened and closed positions;

(e) an arm pivotally mounted at one end to said housing adjacent to said hood, said latch arm having an elongated substantially enclosed slot defined therein and a plurality of notches spaced apart from one another and defined in said arm along and opening into said slot; and (f) a latch mounted to said hood and interfitted with said arm through said slot therein, said latch being movable along said slot upon moving of said hood relative to said housing and being seatable in a selected one of said notches to place said hood at a desired angular position relative to said open top of said housing.

* * * * *